United States Patent [19]

Ootsu

[11] 4,071,305

[45] Jan. 31, 1978

[54] TRANSDUCER FOR CONVERSION OF TIDAL CURRENT ENERGY

[76] Inventor: Fumio Ootsu, 6-4, Shirahae-cho, Saseho Nagasaki, Japan

[21] Appl. No.: 732,187

[22] Filed: Oct. 13, 1976

[51] Int. Cl.² .......................... F04B 17/02; F03B 4/10
[52] U.S. Cl. ....................................... 417/334; 290/43; 415/8
[58] Field of Search ............... 417/330, 334, 335, 336; 415/2, 3, 4, 8; 60/398; 290/43, 42

[56] References Cited

U.S. PATENT DOCUMENTS

| 530,118 | 12/1894 | Nichols | 417/334 |
|---|---|---|---|
| 3,746,875 | 7/1973 | Donatelli | 417/330 X |
| 3,961,479 | 6/1926 | Anderson | 60/496 |
| 3,991,563 | 11/1976 | Pelin | 60/398 X |

*Primary Examiner*—Carlton R. Croyle
*Assistant Examiner*—Richard E. Gluck
*Attorney, Agent, or Firm*—Wenderoth, Lind & Ponack

[57] ABSTRACT

A set of aligned transducer units is fixedly disposed in the sea. Each unit includes two atmosphere compartments on the opposite end portions so that a sea water stream created by tidal current flowing through its lower portion between the compartments drive an impeller disposed between the compartments. The sea water stream rotating the impeller actuates air cylinders disposed in both atmosphere compartments communicating with the atmosphere. The air cylinders compress the air to produce high pressure air. This high pressure air from all the cylinders is transported through a common pipe to an adjacent shore where it may be converted into electrical energy. A ballast water room with its control is connected to the underside of the transducer set for floating and sinking the apparatus.

3 Claims, 8 Drawing Figures

TRANSDUCER FOR CONVERSION OF TIDAL CURRENT ENERGY

BACKGROUND OF THE INVENTION

This invention relates to an apparatus for utilizing the energy of a tidal current and more particularly to a transducer apparatus for converting this energy into high pressure fluid energy.

There have been previously proposed various apparatuses for utilizing the energy of tidal currents but they have not been satisfactory. It is an object of the present invention to provide a new and improved transducer apparatus for effectively converting energy into tidal current to energy into high pressure fluid on a large scale.

SUMMARY OF THE INVENTION

The present invention provides a transducer apparatus for converting tidal current energy into high pressure fluid energy, comprising, in combination, a housing in the form of a rectangular box, a pair of atmosphere compartments in the opposite end portions of the housing respectively and in fluid communication with each other and with the atmosphere, a plenum space and sea water channel between the atmosphere compartments within the housing, the sea water channel being overlaid with the plenum space to communicate with the latter and having both ends opened into the exterior of the housing, an impeller disposed within the communicating plenum space and sea water channel so that an upper half thereof is located in the plenum space and the substantial portion of its lower half is located in the sea water channel, the impeller including a rotary shaft disposed slightly above and parallel to an interface between the plenum space and the sea water channel projects into both atmosphere compartments, and a mechanism for producing a motive fluid disposed in each atmosphere compartment operatively coupled to the end of the rotary shaft projecting into the associated atmosphere compartment. The arrangement is such that, with the apparatus submerged in the sea, a tidal current flows through the sea water channel and drives the impeller, thereby causing the mechanism to produce, as the motive fluid, a high pressure fluid from the air.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
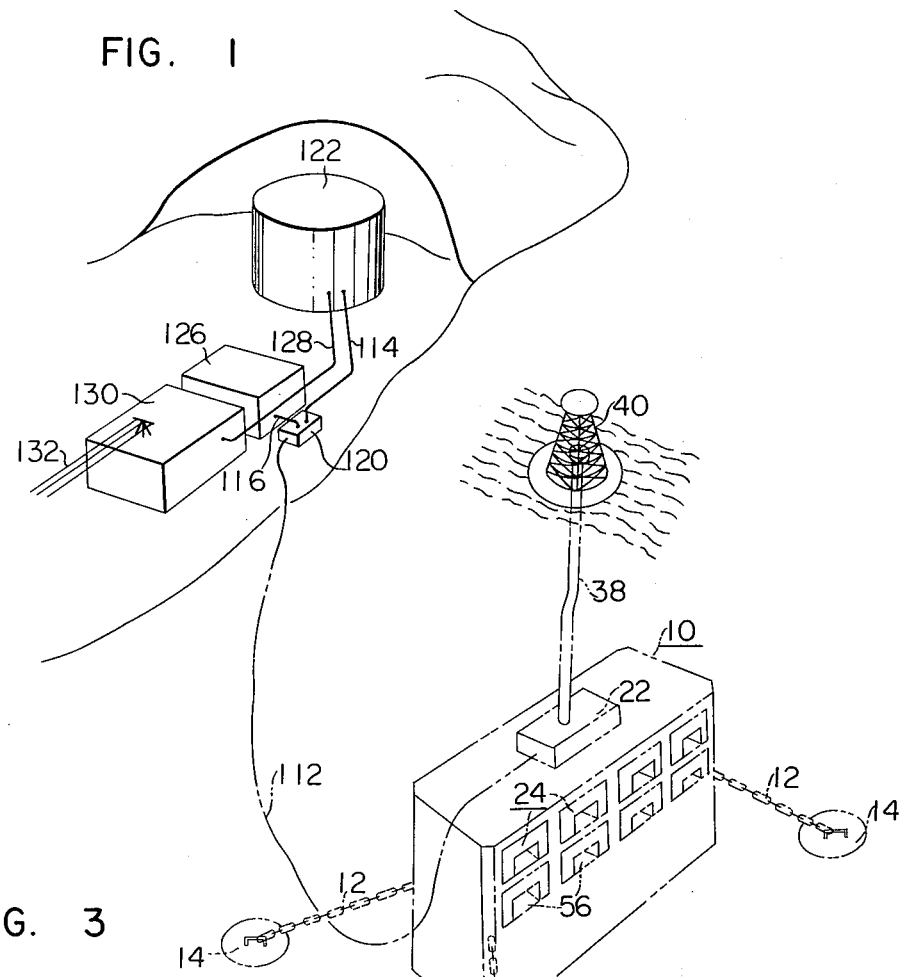
FIG. 1 is a schematic perspective diagram of a transducer apparatus for converting tidal current energy into high pressure fluid energy constructed in accordance with the principles of the present invention and illustrated at its operating position.
Figure 3:
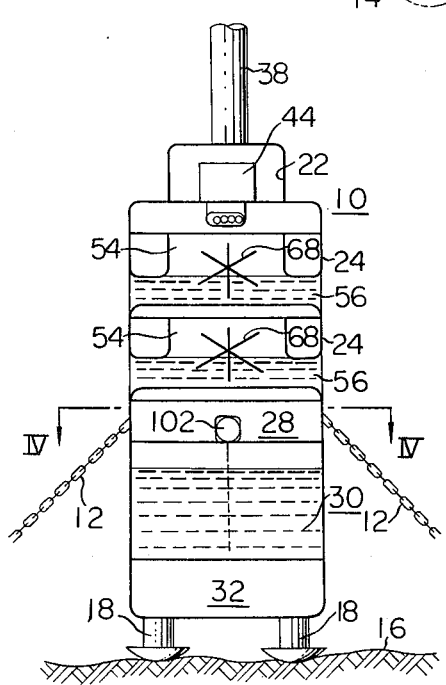
FIG. 3 is a fragmental side elevational sectional view diagram taken along the line III—III of FIG. 2.
Figure 2:
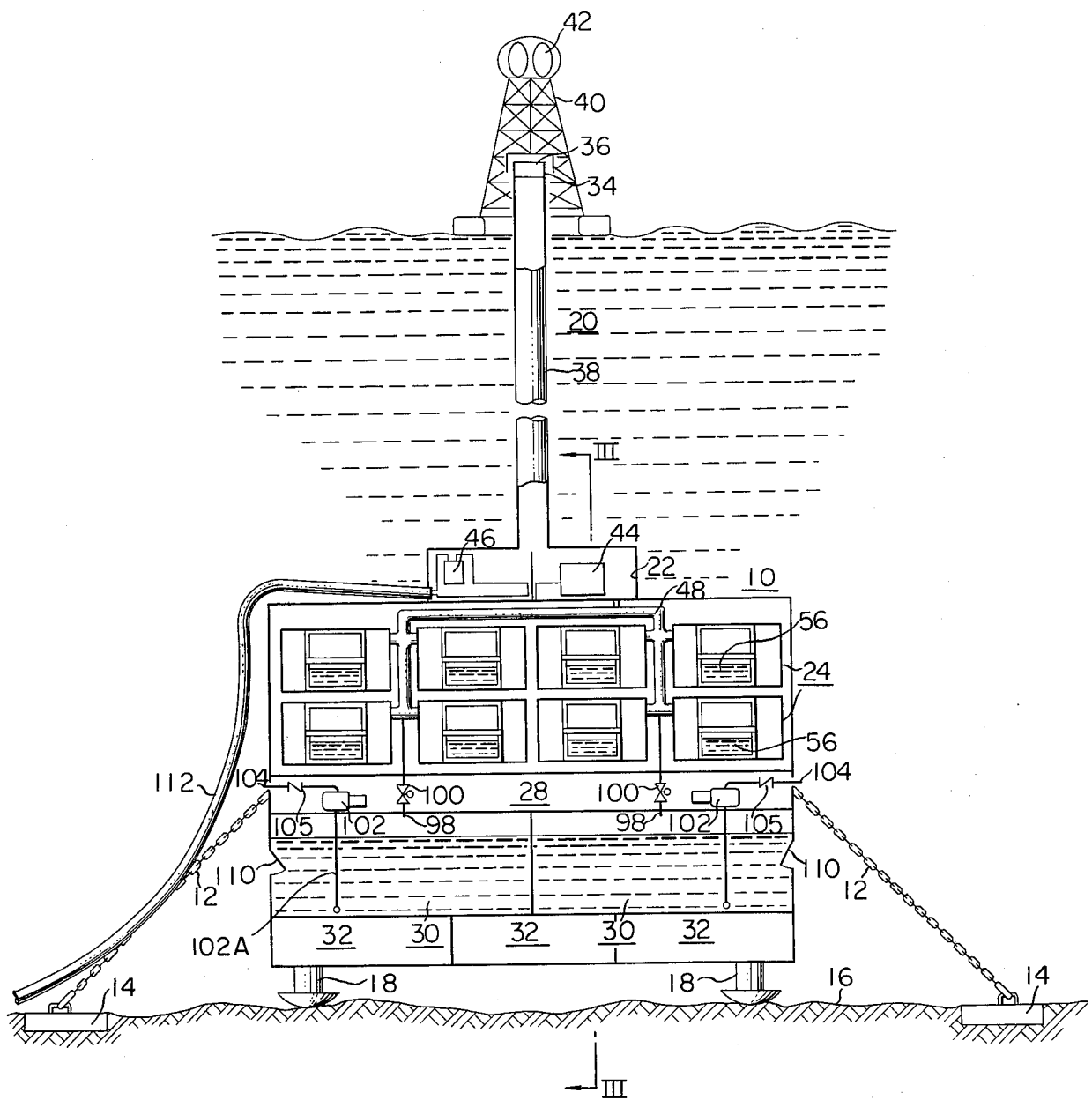
FIG. 2 is a schematic front elevational view, partly in longitudinal section of the vessel shown in FIG. 1 with parts broken away and with parts omitted.

Referring now to FIG. 1 of the drawings, a transducer apparatus is illustrated for converting tidal current energy into high pressure fluid energy constructed in accordance with the principles of the present invention. The arrangement illustrated shows a vessel in the form of a rectangular box 10 and a plurality of, in this case four, anchoring chains 12 connected at one end to the longitudinal corners of the vessel on the middle portions and at the other ends to respective anchoring blocks 14 on the bottom of the sea 16 as best shown in FIG. 2. The vessel 10 further has a plurality of supporting legs 18 (only two of which are illustrated in FIG. 2) attached to the bottom thereof which rest on the bottom of the sea 16. In this way the vessel 10 is maintained submerged and stationary in the sea.

As best shown in FIG. 2, an air introduction unit 20 extends upwardly from a machine room 22 on the top surface of the vessel 10 until its free end projects above the surface of the sea.

As also shown in FIG. 2, the vessel 10 includes an upper portion in which a transducer assembly 24 is disposed which consists of a plurality of, in this case eight, rectangular transducer units 26 arranged in two rows and four columns; an intermediate portion forming a submergence level control room for controlling a level of submergence of the vessel, generally designated by the reference numeral 28; and a lower portion divided into a pair of upper and lower layers. The upper layer includes a plurality of, in this case two, ballast water chambers 30 horizontally aligned with each other, and the lower layer includes a plurality of, in this case three, weighting chambers 32 horizontally aligned with one another.

The air introduction unit 20 includes an air intake port 34 with an air cleaner 36 and an inlet pipe 38 connecting the air intake port 36 to the machine room 22. The inlet pipe 38 is flexible enough to be responsive to a change in the surface of the sea due to the range of the tide and is formed of a material resistant to both water and pressure. To protect against ships navigating too close to the air introduction unit 20, the air intake port 34 is supported by a buoy 40 with an indication lamp 42 at the top thereof.

Within the machine room 22 are an electrically operated compressor 44 and a switchboard 46. The compressor 44 is adapted to compress the air fed into the machine room 22 through the inlet pipe 38 and thereby supply compressed or pressurized air to all the transducer units 26 and, if necessary, to the ballast water chambers 30. The switchboard 46 has electric leads (not shown) connected to all of the electrical equipment within the vessel 10. A piping duct 48 is shown in FIG. 2 and extends from the machine room 22 to all the transducer units 26 and has therein various conduits and pipes (only some of which are shown in FIG. 2).

Figure 5:
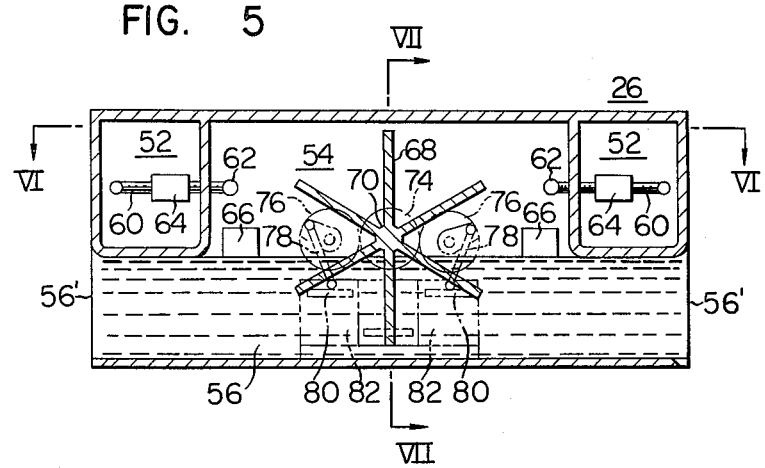
FIG. 5 is a longitudinal sectional view of the transducer unit embodying the principles of the present invention and shown in FIGS. 2 and 3.
Figure 6:
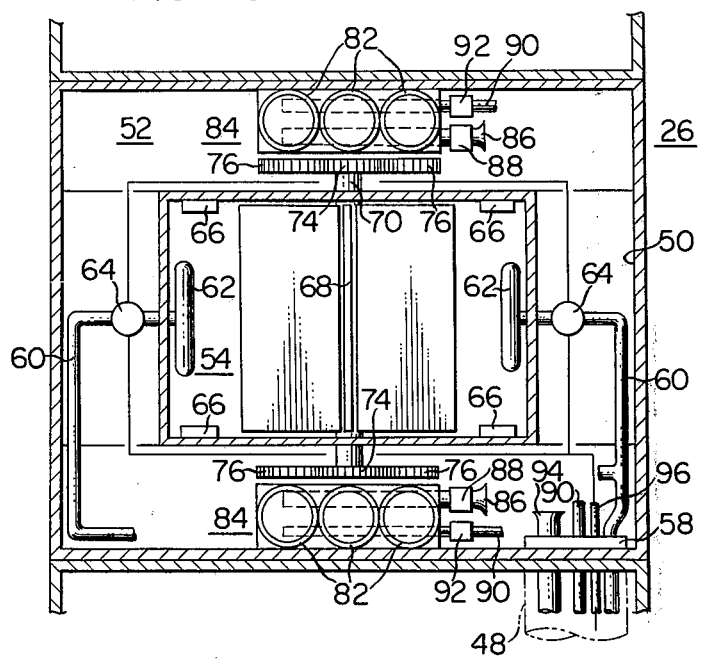
FIG. 6 is a cross sectional view taken along the line VI—VI of FIG. 5.

The transducer units 26 are all of the same construction, therefore, only one of them is described in detail. As best shown in FIGS. 5 and 6, the transducer unit 26 includes a housing 50 in the form of a rectangular box and an atmosphere compartment 52 having an upper portion in the form of a rectangular hollow annulus disposed on the entire edge or verge portion of the housing and a lower portion in the form of a pair of rectangular hollow prisms disposed in opposite relationship on the bilateral end portions of the housing 50 and opened into the opposite side portions of the rectangular hollow annulus. The annular portion of the atmosphere compartment 52 has a bottom somewhat lower in level than the central horizontal plane of the housing 50 and encircles a plenum space 54 having an upper surface defined by the top wall of the housing 50. The plenum space 54 is underlaid and communicates with a sea water channel 56 sandwiched between the bilateral prism portions of the atmosphere compartment 52. The channel 56 has a bottom defined by the bottom wall of the housing 50 and centrally traverses the housing 50 to terminate at openings 56′ disposed on the adjacent portions of a pair of opposite side walls of the housing 50. The channel 56 is coextensive with the cross section of the channel 56. With the vessel 10 submerged into the sea, the channel 56 is put in fluid communication with the sea through the openings 56′ to be filled with the sea water as best shown in FIG. 5.

As shown in FIG. 6, a pipe holder 58 is fixedly secured to the inner wall surface of the housing 50 within the annular portion of the atmosphere compartment 52 and is adjacent to one of the corners of the housing 50. A high pressure feed pipe 60 from the compressor 44 in the machine room 22 extends through and is sealed in the pipe holder 58 along with various conduits and pipes as will be described later. All the conduits and pipes extend through the piping duct 48 prior to the connection to the pipe holder 58. The feed pipe 60 is bifurcated within the annular portion of the atmosphere compartment 52 and the bifurcated portions thereof terminate at a pair of spouting ports 62 positioned in opposite relationship within the plenum space 54 adjacent to the annular compartment 52. An electromagnetic valve 64 is connected in each of the bifurcated pipe portions 60 for the purpose as will be apparent hereinafter.

In operation, a high pressure fluid, in this case, the air from the compressor 44 is delivered to the plenum space 52 to maintain a constant top surface of a tidal current flowing through the sea water channel 56 under the control of a plurality of in this case four, of level sensors 66 suitably disposed within the plenum space 54. In FIG. 5, the top surface of the tidal current is shown as being substantially contacted by the outer bottom wall surface of the level sensors 66 and also by the outer wall surface of the annular compartment 52.

An impeller 68 is centrally disposed within the housing 50 of the transducer unit 26 so that the upper half thereof is located in the plenum space 54 while a substantial portion of the lower half thereof is located in the sea water channel 56. That is to say, the impeller 68 is immersed into a tidal current flowing through the channel 56 in operation as best shown in FIG. 5. To this end, the impeller 68 includes a rotary shaft 70 hermetically and rotatably supported on both end portions by a pair of bearings 72 extending through and sealed in opposite partitions of the prismatic compartment 52 portions respectively so as to run in substantially parallel to and slightly above an interface between the plenum space and sea water channels 54 and 56 respectively, the level of the sea water flowing through the channel 56.

Figure 7:
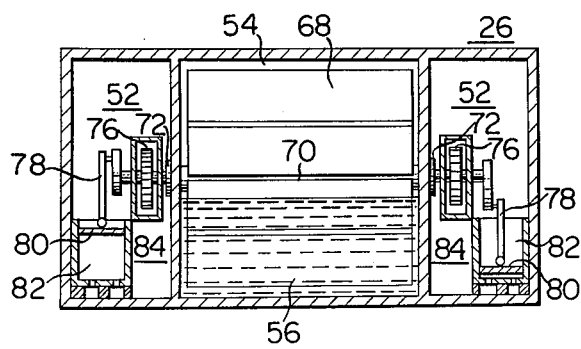
FIG. 7 is a longitudinal sectional view taken along the line VII—VII of FIG. 5.

As shown in FIGS. 6 and 7, the rotary shaft 70 is provided on the free end portions thereof projecting into those opposite portions of the annular atmosphere compartment 52 consecutive to the prismatic compartment 52 with a pair of similar spur gears 74 respectively. Each spur gear 74 meshes with a pair of spur gears 76 disposed on both sides thereof horizontally aligned with each other and with the gear 74. The three meshing gears 74, 76 and 76 are of the same construction and are operatively coupled by individual cranks 78 to respective pistons 80. Each of the pistons 80 is slidably disposed in a fluid cylinder 82 in each of the prismatic atmosphere compartment 52 portions. The pistons 80 and the associated cylinders 82 form a mechanism for producing a compressed or motive fluid, in this case air, generally designated by the reference numeral 84.

In the example illustrated, the three cylinders 82 are juxtaposed with one another, and the mating cranks 78 have their phase angles of rotation different from one another by angles of 120°. As shown in FIG. 6, those three cylinders 82 include a common air inflow pipe 86 connected in fluid communication to the bottom portions thereof as viewed in FIG. 7 and opened into the atmosphere compartment 52 toward the pipe holder 58 with a check valve 88 connected in the open end portion of the inflow pipe 86. The bottom portions of all three cylinders 82 are also connected in fluid communication to a common high pressure delivery pipe 90 provided with a check valve 92.

As shown in FIG. 6, an air introduction pipe 94 extends through and is sealed in the pipe holder 58 and then opens into the atmosphere compartment 52. The introduction pipe 94 extends through the piping duct 48 and opens into the machine room 22 for the purpose of introducing air into the atmosphere compartment 52. Also, the high-pressure delivery pipe 90 from the cylinders 82 extends through and is and sealed within the pipe holder 58 and then passes through the duct 48 to reach the machine room 22 for the purpose as will be apparent hereinafter. Further a wiring conduit 96 is shown in FIG. 6 extends through and is sealed within the pipe holder 58 and passes through the duct 48. Then the conduit 96 reaches the switchboard 46 disposed in the machine room 22. However the pipes 94 and 96 and the conduit 96 are not illustrated in FIG. 2 only for purposes of clarity. In FIG. 6, a single electric conductor is shown as extending through the wiring conduit 96. This electric conductor is representative of electric leads connected to the electromagnetic valves 64 disposed in the atmosphere compartment 52 for energization and to the level sensor 66 disposed in the plenum space 54 for control purposes. Those electric leads are connected to the switchboard 46 disposed in the machine room 22 although they are not illustrated in FIG. 2 only for purposes of clarity.

Referring back to FIG. 2, the high pressure feed pipe (not shown in FIG. 2) from the compressor 44 includes a plurality of branches 98 (only two of which are illustrated in FIG. 2) extending through the submergence control room 28 where an electromagnetic valve 100 is connected in each branch 98. Then, the branches 98 are opened into the ballast chamber 30. The electromagnetic valves 100 are connected to an electric lead (not shown) to the switchboard 46 (see FIG. 2).

Figure 4:
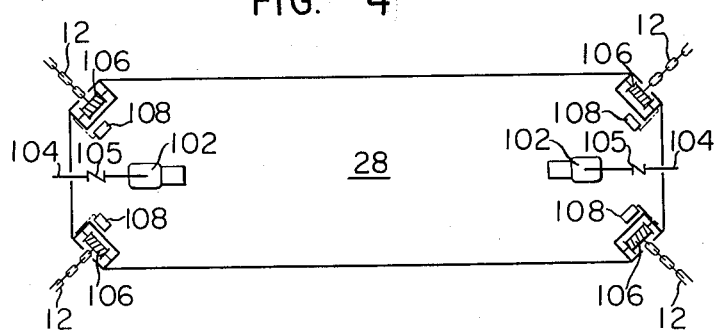
FIG. 4 is a cross sectional view taken along the line IV—IV of FIG. 3.

As best shown in FIG. 4, a pair of ballast drain pumps 102 are disposed in the submergence control room 28 and are connected to respective drain pipes 104. Each drain pipe 104 is provided with a check valve 105 and extends in water tight relationship through the side wall of the chamber 28 until it terminates at an open end slightly projecting into the exterior of the vessel or the sea water. Each drain pipe 104 includes a suction pipe 102A open adjacent to the bottom of the ballast room 20 (see FIG. 2). Further a hoisting winch 106 is disposed in each of the corner portions of the chamber 28 isolated from the remaining portion thereof and is driven by an electric motor 108 disposed adjacent to the hoisting winch 106 within the remaining chamber portion. To pay out and take up the associated chain 12, the pumps 102 and motors 108 are adapted to be energized through electric leads (not shown) to the switchboard 46 in the machine room 22.

As shown in FIG. 2 each of the ballast chambers includes a gate 110 disposed on the outer wall thereof.

Figure 8:
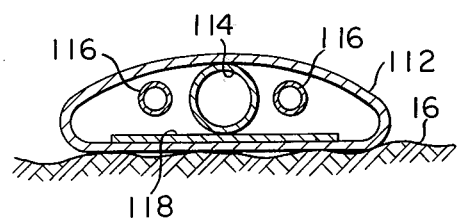
FIG. 8 is a cross sectional view of that portion of the connection cable shown at dotted line in FIG. 1 and disposed on the bottom of the sea.

As also shown in FIG. 2, the machine room 22 has a flexible watertight cable sheath 112 extended therefrom. The cable sheath 112 is trained over the bottom of the sea 16 until it arrives at a shore adjacent to the vessel 10 as shown in FIG. 1. As shown in FIG. 8, the cable sheath 112 is relatively flat so as to present a low resistance to tidal currents and contains a flexible, compressed-air feed pipe 114 and a pair of flexible electric cables 116. Further a weight 118 in the form of discrete sheets aligned with one another is disposed on the bottom of the cable sheath 112 in order to stably lay the cable sheath 112 on the bottom of the sea 16.

In the machine room 22 the compressed air pipe 114 is connected to the high pressure delivery pipe 90 connected to the fluid cylinders 82, and a plurality of electric conductors extending through one of the electric cables 116 are electrically connected through the switchboard 46 to associated equipment installed within the vessel 10 such as electric motors, electromagnetic valves, etc. in order to energize them. Similarly, a plurality of electric conductors extending through the other cable 116 are connected through the switchboard 46 to associated controls such as the level sensors 66 and are adapted to transmit control signals in the form of carrier waves therethrough.

Referring back to FIG. 1, the cable sheath 112 after having landed at the shore enters a cable house 120 located in proximity of the shore. In the housing 120 the compressed-air pipe 114 is provided with a check valve (not shown) and then leaves the housing 120 and is connected to a high pressure tank 122 adjacent the cable house 120. The pair of electric cables 116 enter a remote control cottage 126. A high pressure feed pipe 128 from the tank 122 is connected to a high pressure fluid operated motor (not shown) in an electric power generation plant 130 adjacent the remote control cottage 126. The motor is operatively coupled to an electric generator (not shown) in the plant 130 which has its output connected to a transmission system 132. The generator is also adapted to supply electric power to the vessel 10 through the power cable 116.

The arrangement thus far described is operated as follows: The vessel 10 with the gates 110 brought into their closed position is towed to a predetermined position on the surface of the sea and then the gates 110 are opened to permit the sea water to be introduced into the ballast water chambers 30. The sea water is also introduced into all the sea water channels 56 until it fills each transducer unit 26 up to a part of the plenum space 54. In that case the longitudinal axis of each channel 56 preferably lies in a direction of a tidal current, and in this way the vessel 10 is submerged in the sea until the supporting legs 20 of the vessel 10 rest on the bottom of the sea 16. Then the four anchoring chains 12 connected to the respective anchoring blocks 14 drop on the bottom of the sea 16 to maintain the vessel substantially stationary by having the anchoring blocks 14 biting into the bottom of the sea 16 as shown in FIG. 2.

An actuation signal from the remote control cottage 126 is delivered through the control cable 116 to the compressor 44 in the machine room 22 to drive it from a source of electric power disposed therefor in the room 22 and to supply high pressure air to each of the plenum spaces 54 through the high pressure pipe 60. This increases the fluid pressure within that plenum space 54 and depresses the level of the sea water flowing through the associated sea water channels 56. When the sea water flowing through each channel 56 reaches a predetermined level as determined by the associated level sensors 66, the electromagnetic valves 64 in each atmosphere compartment respond to a control signal from the remote control cottage 126 fed thereto through the control cable 116 and are closed, thereby stopping the supply of the high pressure air to the associated plenum space 54 to maintain the predetermined sea level in the mating sea water channel 56. If the sea level in a particular channel 56 exceeds the predetermined magnitude, the associated sensors 60 operate to open the corresponding electromagnetic valves 64 in response to a control signal from the control cottage 126. In this way, the level sensors 66 cooperate with the associated electromagnetic valves 64 to maintain the predetermined sea level in each of the sea water channels 56. At the same time, a tidal current due to the particular tide continues to flow through each sea-water channels 56 in one or the other of the directions. It will readily be understood that the tidal current flowing through each channel 56 is reversed in direction in response to a change in tide from one to the other of the reflux and flux.

Within each transducer unit 26 the tidal current flowing through the associated sea water channel 56 causes the rotation of the impeller 68 in a direction as determined by the direction of flow thereof. The rotation of each impeller 68 causes the actuation of the associated compressed air mechanism 84 through the mating spur gears 74, 78 and 78 and the cranks 80. Thus the air spouted into each atmosphere compartment 52 from the associated atmosphere pipe 90 and sucked into the cylinders 82 through the corresponding pipe 86 is compressed, and the compressed air as a motive fluid is delivered through the mating high pressure pipes 90 to the compressed air feed pipe 114. Then, the compressed air flowing through the pipe 114 within the cable sheath 112 enters into the high pressure tank 122. The compressed air accumulated in the tank 122 is fed to the fluid operated motor (not shown) in the power generation plant 130 and rotates the electric generator (not shown) connected to the motor to thereby produce electric power. The electric power is adapted to be transmitted through the transmission system 132.

It is noted that once the electric power has been produced in the power generation plant 130, the compressor 44 is switched to be energized with a part of that electric power through the power cable 116.

When the vessel 10 is subjected to periodic inspection or if a failure occurs in the vessel 10 for any reason, control signals from the remote control cottage 126 are fed to the vessel 10 through the control cable 116 to close the gates 110 and to drive the drain pumps 102 to drain the ballast chambers 30. At the same time, the electromagnetic valves 100 are opened to aid the drainage of the ballast chambers 30 until the vessel 10 is floated up on the sea surface. Thereafter the periodic inspection can be effected. Alternatively the cause of the failure can be corrected.

Then the process as above described is repeated to put the vessel 10 again into operation.

Thus it is seen that the present invention provides an apparatus capable of effectively picking up and utilizing tidal current energy in a large scaled manner by means of a device adjacent the bottom of the sea which also permits ships to navigate in the vicinity thereof without any hindrance. Further, the present invention maybe unattended because of the utilization of the remote control functions performed on land.

While the present invention has been illustrated and described in conjunction with a single preferred embodiment thereof, it is to be understood that numerous changes and modifications may be resorted to without departing from the spirit and scope of the present invention. For example, the present invention is equally applicable to apparatuses which require high pressure fluid other than an electric power generation plant as above described.

What is claimed is:

1. A transducer apparatus for converting an energy of a tidal current to an energy of a high pressure fluid, comprising, in combination, a housing in the form of a rectangular box, a pair of atmosphere compartments disposed on the opposite end portions of said housing thereof and in fluid communication with each other and with the atmosphere, a plenum space and a sea-water channel disposed between said pair of atmosphere compartments within said housing, said sea-water channel being overlain with said plenum space to communicate with the latter and having both ends opened into the exterior of said housing, an impeller disposed within said communicating plenum space and sea-water channel so that an upper half thereof is located in said plenum space and the substantial portion of its lower half is located in said sea-water channel, said impeller including a rotary shaft disposed slightly above and in parallel to an interface between the plenum space and the sea-water channel to project into both atmosphere compartments, and a mechanism for producing a motive fluid disposed in each of said atmosphere compartments to be operatively coupled to the end of said rotary shaft projecting into the associated atmosphere compartment, the arrangement being such that, with the apparatus submerged in the sea, a tidal current flows through said sea-water channel to drive said impeller to cause said mechanism for producing, as the motive fluid, high pressure air from the air.

2. A transducer apparatus as claimed in claim 1 wherein said mechanism for producing the motive fluid includes at least one fluid cylinder means for compressing the air to produce high pressure air.

3. A transducer apparatus for converting an energy of a tidal current to an energy of a high pressure fluid, comprising, in combination, a rectangular vessel, a plurality of transducer units disposed in aligned relationship on the upper portion of said vessel, each of said transducer units including a pair of atmosphere compartments disposed on the opposite ends portions thereof and in fluid communication with each other, a plenum space and a sea-water channel disposed between said atmosphere compartments, said sea-water channel being overlain with said plenum space to communicate with the latter and having both ends opened into the exterior of said vessel, an impeller disposed within the communicating plenum space and sea-water channel so that an upper half thereof is located in said plenum space and the substantial portion of its lower half is located in said sea-water channel, a rotary shaft for said impeller disposed slightly above and in parallel to an interface between said plenum space and said sea-water channel to project into both atmosphere compartments, and fluid cylinder means disposed in each of said atmosphere compartments to be operatively coupled to the end of said rotary shaft projecting into the associated atmosphere compartment, air introduction means projecting from said vessel and connected to said atmosphere compartments disposed in all said transducer units to supply the air to all said fluid cylinder means, and means on the lower portion of the vessel for controllably submerging said vessel in the sea and maintaining the same stationary.

* * * * *